(12) United States Patent
Schreiber et al.

(10) Patent No.: US 9,746,673 B2
(45) Date of Patent: Aug. 29, 2017

(54) PROJECTION DISPLAY AND METHOD FOR PROJECTING AN OVERALL IMAGE

(71) Applicant: Fraunhofer-Gesellschaft zur Foerderung der angewandten Forschung e.V., Munich (DE)

(72) Inventors: Peter Schreiber, Jena (DE); Marcel Sieler, Jena (DE); Matthias Kraus, Jena (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 337 days.

(21) Appl. No.: 14/500,122

(22) Filed: Sep. 29, 2014

(65) Prior Publication Data

US 2015/0085259 A1    Mar. 26, 2015

Related U.S. Application Data

(63) Continuation of application No. PCT/EP2013/056749, filed on Mar. 28, 2013.

(30) Foreign Application Priority Data

Mar. 29, 2012  (DE) .................... 10 2012 205 164

(51) Int. Cl.
*G02B 27/10* (2006.01)
*G02B 27/01* (2006.01)
*G02B 3/08* (2006.01)

(52) U.S. Cl.
CPC ....... *G02B 27/017* (2013.01); *G02B 27/0101* (2013.01); *G02B 27/0172* (2013.01);
(Continued)

(58) Field of Classification Search
CPC ... G02B 3/0056; G02B 3/0031; G02B 3/0012
(Continued)

(56) References Cited

U.S. PATENT DOCUMENTS 5,499,138 A * 3/1996 Iba ................................ 359/569
5,561,538 A   10/1996 Kato et al.
(Continued)

FOREIGN PATENT DOCUMENTS

JP   05328261 A   12/1993
JP   2001525564 A 12/2001
(Continued)

OTHER PUBLICATIONS

Kasai, Ichiro et al., "A Forgettable Near Eye Display", Proceedings of the 4th International Symposium on Wearable Computers (ISWC), Oct. 16-17, 2000, pp. 115-118.
(Continued)

*Primary Examiner* — James Greece
(74) *Attorney, Agent, or Firm* — Michael A. Glenn; Perkins Coie LLP

(57) ABSTRACT

A projection display includes an imager for displaying sub-images in a two-dimensional distribution of sub-areas of the imager and a projection optics array with a two-dimensional distribution of projection optics. The projection optics array is configured to superimpose projections of the sub-images to an overall image in an image plane such that a mutual area overlap of the projections of the sub-images in the image plane in pairs results, which is between 0.1 and 0.8 for all pairs. Here, the projection display is implemented such that the overall image is a virtual overall image.

15 Claims, 8 Drawing Sheets

(52) U.S. Cl.
CPC .......... *G02B 3/08* (2013.01); *G02B 2027/011* (2013.01); *G02B 2027/015* (2013.01); *G02B 2027/0152* (2013.01)

(58) Field of Classification Search
USPC .................................................. 359/619–628
See application file for complete search history.

(56) References Cited

U.S. PATENT DOCUMENTS

| | | |
|---|---|---|
| 5,883,606 A | 3/1999 | Smoot |
| 6,611,241 B1 | 8/2003 | Firester et al. |
| 6,816,313 B2 | 11/2004 | Hara |
| 8,777,424 B2 | 7/2014 | Schreiber et al. |
| 2008/0204731 A1 | 8/2008 | Williams |
| 2009/0153960 A1 | 6/2009 | Inoguchi et al. |
| 2009/0315887 A1 | 12/2009 | Yamaguchi |

FOREIGN PATENT DOCUMENTS

| | | |
|---|---|---|
| JP | 2002122806 A | 4/2002 |
| JP | 2003043409 A | 2/2003 |
| JP | 2008241822 A | 10/2008 |
| JP | 2009145617 A | 7/2009 |
| JP | 2012003232 A | 1/2012 |
| KR | 1020110136688 A | 12/2011 |
| TW | 201207548 A | 2/2012 |
| WO | 2009066475 A1 | 5/2009 |
| WO | 2010035607 A1 | 4/2010 |
| WO | WO-2010145784 | 12/2010 |
| WO | WO-2010145884 | 12/2010 |
| WO | WO-2011157632 | 12/2011 |

OTHER PUBLICATIONS

Kurtz, Russell M. et al., "Image Tiling for a High-Resolution Helmet-Mounted Display", Proceedings of SPIE, vol. 5800; Bellingham, Washington, Jan. 1, 2005, pp. 130-137.

Takagi, A. et al., "Development of Stereo Video See-through HMD for AR Systems", IEEE International Symposium on Augmented Reality, Oct. 2000, pp. 68-77.

* cited by examiner

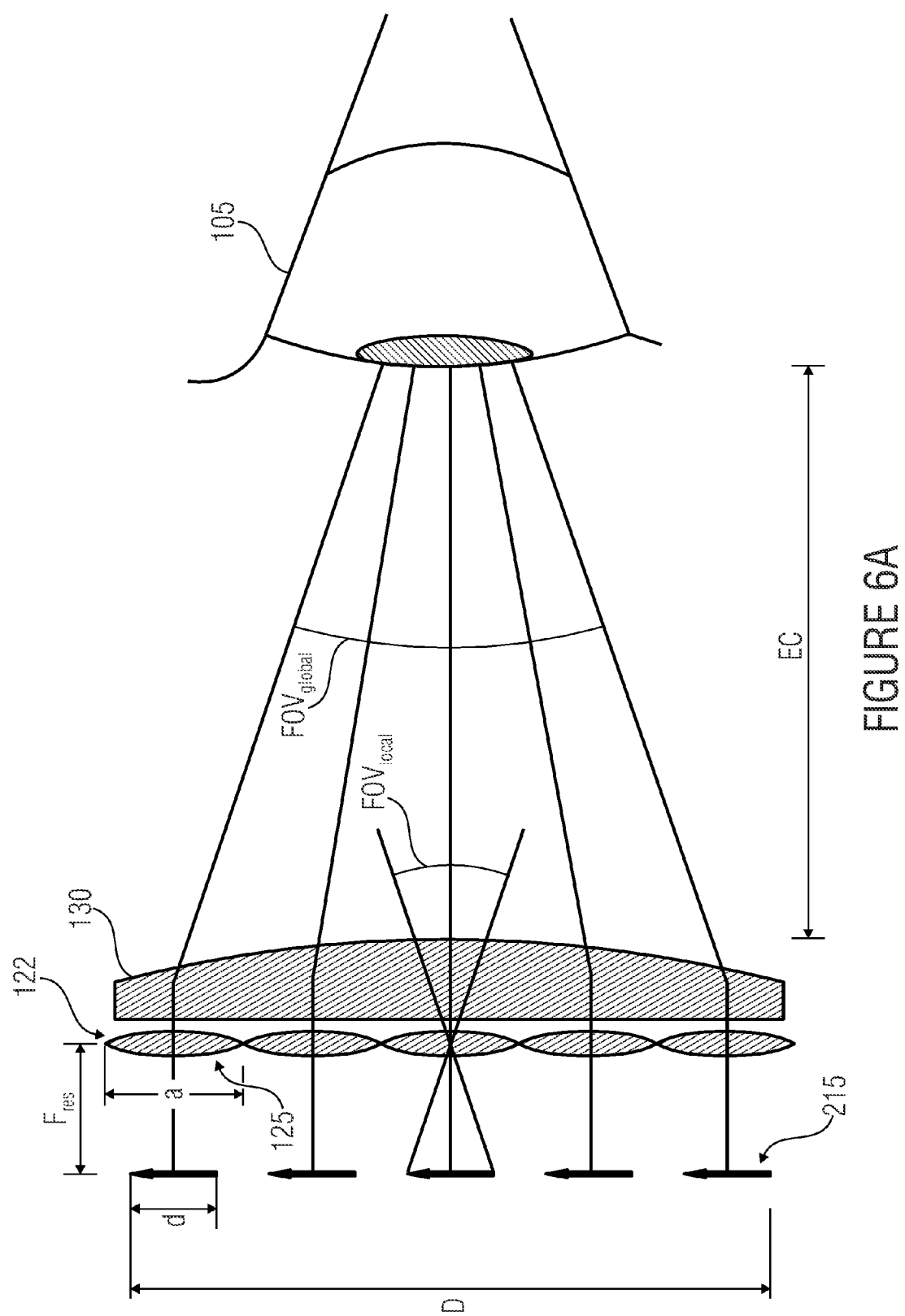

PROJECTION DISPLAY AND METHOD FOR PROJECTING AN OVERALL IMAGE

CROSS-REFERENCE TO RELATED APPLICATIONS

This application is a continuation of copending International Application No. PCT/EP2013/056749, filed Mar. 28, 2013, which is incorporated herein by reference in its entirety, and additionally claims priority from German Application No. 10 2012 205 164.3, filed Mar. 29, 2012, which is also incorporated herein by reference in its entirety.

BACKGROUND OF THE INVENTION

Embodiments of the present invention relate to a projection display and a method for projecting an overall image. Further embodiments of the present invention relate to a projection display for virtual images with multichannel optics.

Head-mounted displays (HMD) are commonly realized with a micro display, such as an LCD (liquid crystal display), LCoS (liquid crystal on silicon) or OLED (organic light emitting diode)-based micro display, in connection with ocular optics which maps the micro display to a distance suitable for visualization between the distinct visual distance and infinity. The focal length of the ocular $f_{Ok}$ determines, together with the diagonal D of the micro display, the field of view (FOV) of the head-mounted display:

$$FOV = 2\mathrm{atan}\frac{D}{2f_{Ok}} \quad (1)$$

In order to obtain common fields of view of head-mounted displays in the range between 40° and 60° with available micro imagers with typical diagonal screens of ⅔", ocular focal lengths in the range between 15 and 23 mm are necessitated. Here, the pupil diameter of the ocular $D_{pupil}$ determines the size of the range within which the eye of the viewer can move (eye motion box, EMB). The pupil size or EMB is obtained from the ratio of focal width $f_{Ok}$ and f-number f/# of the ocular:

$$EMB = D_{Pupille} = \frac{f_{Ok}}{\frac{f}{\#}} \quad (2)$$

For typical f-numbers in the range of approx. f/2.8, an EMB of the order of magnitude of 5 to 8 mm is obtained. Here, two main problems appear. On the one hand, the comparatively large necessitated ocular focal length results in large system dimensions, which deteriorates the wearing comfort of the head-mounted display. On the other hand, the low f-number necessitated for a large EMB together with the large FOV makes the correction of mapping errors more difficult, which increases the complexity (and hence the size and mass) of the ocular optics even further.

In order to reduce the size of the optics with the given focal length, in conventional technology, for example, optical paths folded several times, such as in the "Canon Video see-through" system as in (A. Takagi, S. Yamazaki, Y. Saito, and N. Taniguchi "Development of a stereo video see-through HMD for AT systems", in Int. Symp. On Augmented Reality, Munich, Germany, Oct. 5-6, 2000), or a displacement of the ocular optics in the direction of the side pieces with subsequent image guide for mirroring into the eye, such as in (Ichiro Kasai Yasushi, Yasushi Tanijiri, Takeshi Endo, Hiroaki Ueda "A Forgettable Near Eye Display", Proc. 4$^{th}$ Int. Symp. on Wearable Computers, ISWC 2000, Atlanta), are used. The main disadvantages of these known optics schemes are the resulting comparatively large system dimensions and masses as well as the complicated free form optics necessitated for aberration correction according to conventional technology, such as in (A. Takagi, S. Yamazaki, Y. Saito, and N. Taniguchi, "Development of a stereo video see-through HMD for AT systems", in Int. Symp. On Augmented Reality, Munich, Germany, Oct. 5-6, 2000), or image guide elements that are very complex to produce, such as in (Ichiro Kasai Yasushi, Yasushi Tanijiri, Takeshi Endo, Hiroaki Ueda "A Forgettable Near Eye Display", Proc. 4$^{th}$ Int. Symp. on Wearable Computers, ISWC 2000, Atlanta).

An alternative optical approach described in conventional technology uses lens array (lens grid) optics, wherein one lenslet (lens element) is allocated to one pixel of a micro imager each, as is described in U.S. Pat. No. 5,499,138, U.S. Pat. No. 5,561,538, U.S. Pat. No. 6,816,313 B2 and US 2008/020473 A1. While this known alternative optics scheme promises a very small structural length of the optics, it allows only a very small displayable number of pixels and a very low transmission, resulting in a low image brightness and short battery run-time for network-independent devices.

A further known approach is the usage of an array projector or raster projector, as is described in WO 2010/145784 A1). With this approach, clearly greater image brightness can be obtained as compared to the array optics or raster optics described in U.S. Pat. No. 5,499,138, U.S. Pat. No. 5,561,538, U.S. Pat. No. 6,816,313 B2 and US 2008/020473 A1. However, the known array projector based on multichannel projection has, the disadvantage that the displayable number of pixels still lags behind the single-channel optics, such as in (A. Takagi, S. Yamazaki, Y. Saito, and N. Taniguchi, "Development of a stereo video see-through HMD for AT systems", in Int. Symp. On Augmented Reality, Munich, Germany, Oct. 5-6, 2000) and (Ichiro Kasai Yasushi, Yasushi Tanijiri, Takeshi Endo, Hiroaki Ueda "A Forgettable Near Eye Display", Proc. 4$^{th}$ Int. Symp. on Wearable Computers, ISWC 2000, Atlanta).

U.S. Pat. No. 6,611,241 B1 describes large optical displays comprising an array of smaller display devices or modules, each of which showing part of the image to be displayed, so that the array of smaller display devices together displays the complete image. The display device can use display elements having no narrow edges and that are not contiguous in order to generate overlapping sub-images. Image pixels that are otherwise "interfaces" or gaps are generated by the image data and displayed at the correct position and brightness within the displayed image, such as in the overlap regions of the overlapping sub-images.

WO 2011/157632 A1 describes a projection display having at least one light source, at least one reflective imager that is implemented to display individual images in a two-dimensional distribution of sub-areas, a projection optics array with a two-dimensional array of projection optics, which is implemented to map an allocated sub-area of the at least one imager to one image level each, so that mappings of the individual images overlap to an overall image in the image plane, and at least one beam splitter that is arranged in an optical path between the at least one reflective imager and the two-dimensional array of projection optics on the one hand and in the optical path between the at least one light source and the at least one reflective imager on the other hand.

U.S. Pat. No. 5,499,138 describes an image display apparatus, such as an image display apparatus of the spectacle type which is able to reproduce a high-resolution image by projecting pixels at a correct pitch on the retina in the eye of the user. The image display apparatus comprises a microlens array. Instead of the microlens array, a Fresnel zone plate array can also be used.

A disadvantage of the projection system described in U.S. Pat. No. 5,499,138 is the allocation of only one (single) display pixel (e.g. very small LED chip or LCD pixel) to one microlens each. Thus, this known approach results in a lower displayable number of pixels with at the same time large lateral optics dimensions.

Hence, it is a basic problem that no concept exists in conventional technology which unites multichannel projection for a larger number of displayable pixels with a small structural length of a projection display.

SUMMARY

According to an embodiment, a projection display may have: an imager for displaying sub-images in a two-dimensional distribution of sub-areas of the imager; a projection optics array with a two-dimensional distribution of projection optics implemented to superimpose projections of sub-images to an overall image in an image plane such that a mutual area overlap of the projections of the sub-images in the image plane in pairs results, which is between 0.1 and 0.8 for all pairs; wherein the projection display is implemented such that the overall image is a virtual overall image.

According to another embodiment, a method for projecting an overall image with a projection display may have the steps of: displaying sub-images with an imager in a two-dimensional distribution of sub-areas of the imager; superimposing projections of the sub-images to an overall image in an image plane by a projection optics array with a two-dimensional distribution of projection optics such that a mutual area overlap of the projections of the sub-images in the image plane in pairs results, which is between 0.1 and 0.8 for all pairs; wherein the projection display is implemented such that the overall image is a virtual overall image.

Embodiments of the present invention provide a projection display comprising an imager for displaying sub-images in a two-dimensional distribution of sub-areas of the imager and a projection optics array having a two-dimensional distribution of projection optics. The projection optics array is implemented to superimpose projections of the sub-images to an overall image in an image plane, such that a mutual area overlap of the projections of the sub-images in the image plane in pairs results, which is between 0.1 and 0.8 for all pairs. Here, the projection display is implemented such that the overall image is a virtual overall image.

It is the core idea of the present invention that the above-stated larger number of displayable pixels of the multichannel projection with simultaneously smaller structural length of the projection display can be obtained when sub-images are displayed with an imager in a two-dimensional distribution of sub-areas of the imager and when projections of the sub-images are superimposed to an overall image in an image plane by a projection optics array having a two-dimensional distribution of projection optics, such that a mutual area overlap of the projections of the sub-images in the image plane in pairs results, which is between 0.1 and 0.8 for all pairs, wherein the projection display is implemented such that the overall image is a virtual overall image. Thus, on the one hand, the larger number of displayable pixels (or the higher image quality) of the multichannel projection can be obtained and, on the other hand, simultaneously, the smaller structural length of the projection display can be realized. Here, displaying sub-images can be used and a specific superposition of projections of the sub-images in an image plane to a (virtual) overall image can be used.

In embodiments of the present invention, the projection optics array further comprises a field lens downstream to the two-dimensional distribution of projection optics in the projection direction to direct the projections of the sub-images into a pupil of a user of the projection display. Thus, the image plane can be a virtual image plane, wherein the imager and the two-dimensional distribution of the projection optics are arranged between the same and the field lens.

In embodiments of the present invention, the imager is implemented to display each of the sub-images with an image brightness which continuously decreases towards the edge of the sub-image. Thus, artifacts in an overlapping area of the projections in the image plane can be suppressed or prevented.

In embodiments of the present invention, the imager is implemented to displace all sub-images evenly in the direction of a lateral extension of the two-dimensional distribution of the sub-areas of the imager. Here, the even displacement of the sub-images can be adjusted in dependence on a measured position of an eyeball of a user with respect to an optical axis of the projection optics array. Thus, compensation of a decentralization of the eyeball of the user with respect to the optical axis of the projection optics array can be obtained. By compensating this decentralization, perception of ghost images can be suppressed or prevented.

BRIEF DESCRIPTION OF THE DRAWINGS

Embodiments of the present invention will be detailed subsequently referring to the appended drawings, in which.

DETAILED DESCRIPTION OF THE INVENTION

Before the present invention will be discussed below in more detail based on the figures, it should be noted that in the following embodiments the same elements or functionally equal elements in the figures are provided with the same reference numbers. Thus, a description of elements having the same reference numbers is mutually exchangeable and/or applicable to one another in different embodiments.

Figure 1A:
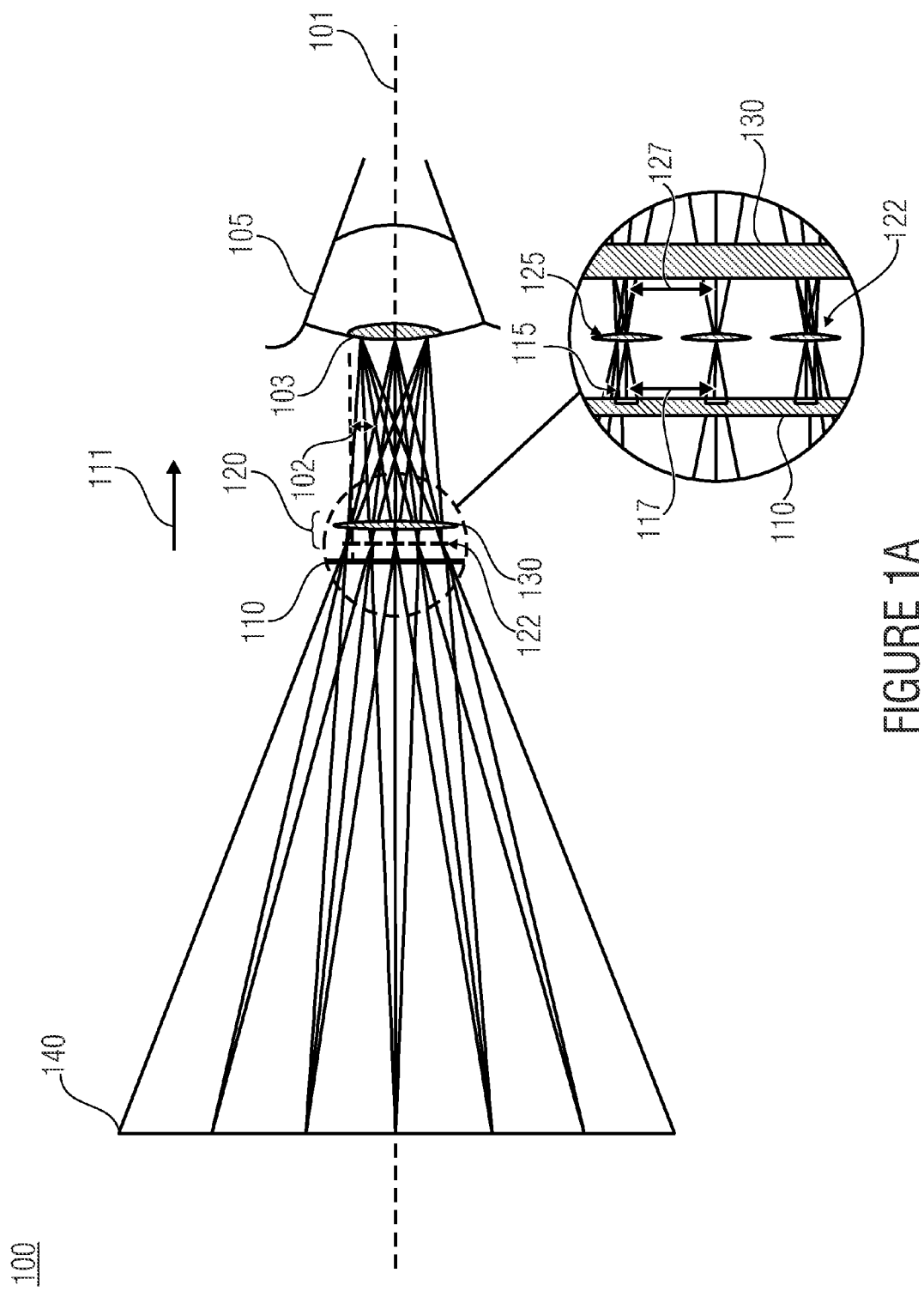
FIG. 1A is a side view of a projection display according to an embodiment of the present invention.
Figure 1B:
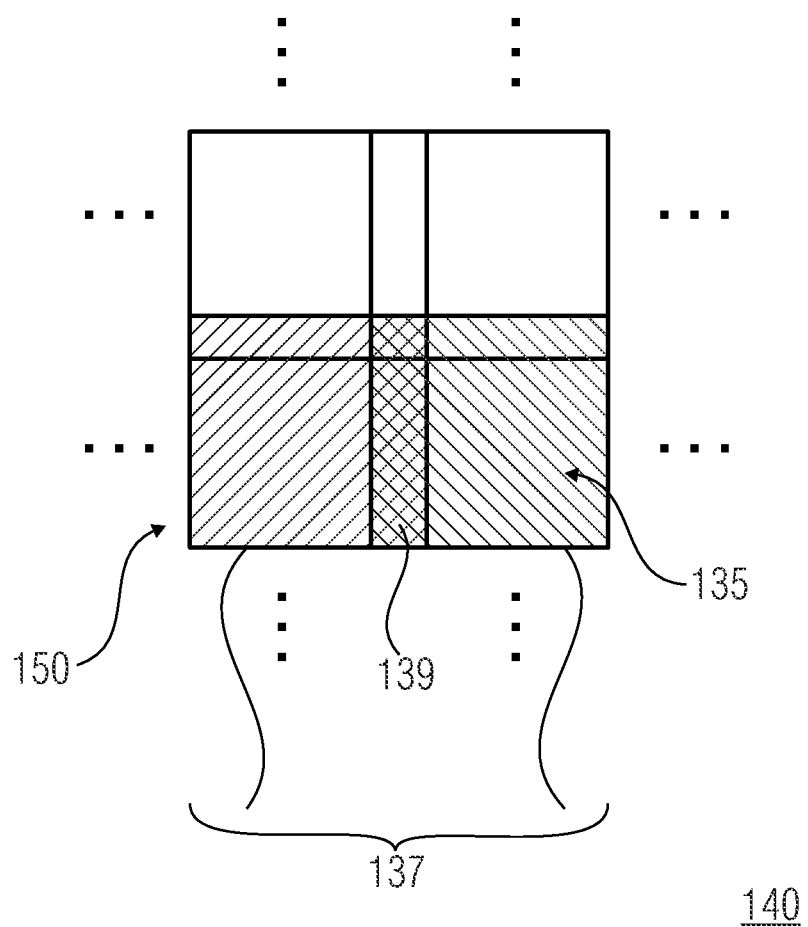
FIG. 1B is a schematic representation for illustrating an inventive mutual area overlap of projections of sub-images in an image plane.

FIG. 1A shows a side view of a projection display 100 according to an embodiment of the present invention. As is shown in FIG. 1A, the projection display 100 comprises an imager 110 for displaying sub-images in a two-dimensional distribution of sub-areas 115 of the imager 110. Further, the projection display 100 shown in FIG. 1A comprises a projection optics array 120 having a two-dimensional distribution 122 of projection optics 125. FIG. 1B shows a schematic representation for illustrating an inventive mutual area overlap of projections of sub-images in an image plane. With respect to FIGS. 1a and 1b, the projection optics array 120 of the projection display 100 is implemented to superimpose projections 135 of the sub-images to an overall image 150 in an image plane 140 such that a mutual area overlap 139 of the projections 135 of the sub-images in the image plane 140 in pairs results, which is between 0.1 and 0.8 for all pairs 137. Here, the projection display 100 is implemented such that the overall image 150 is a virtual overall image. By providing the mutual area overlap which is between 0.1 and 0.8 for all pairs, multichannel projection having a higher image quality can be obtained, with a simultaneously smaller structural length of the projection display.

In particular, the projection display 100 is implemented such that the overall image 150 is a virtual overall image and that no (projection) screen is necessitated.

In embodiments, the pairs 137 can be formed by the projections 135 overlapping in pairs, and the same (all of them) comprise a mutual area overlap 139 which is between 0.1 and 0.8. Here, reference is also made to FIG. 1B, where it is exemplarily shown that all (adjacent) pairs 137 can overlap in the image plane 140.

Figure 6B:
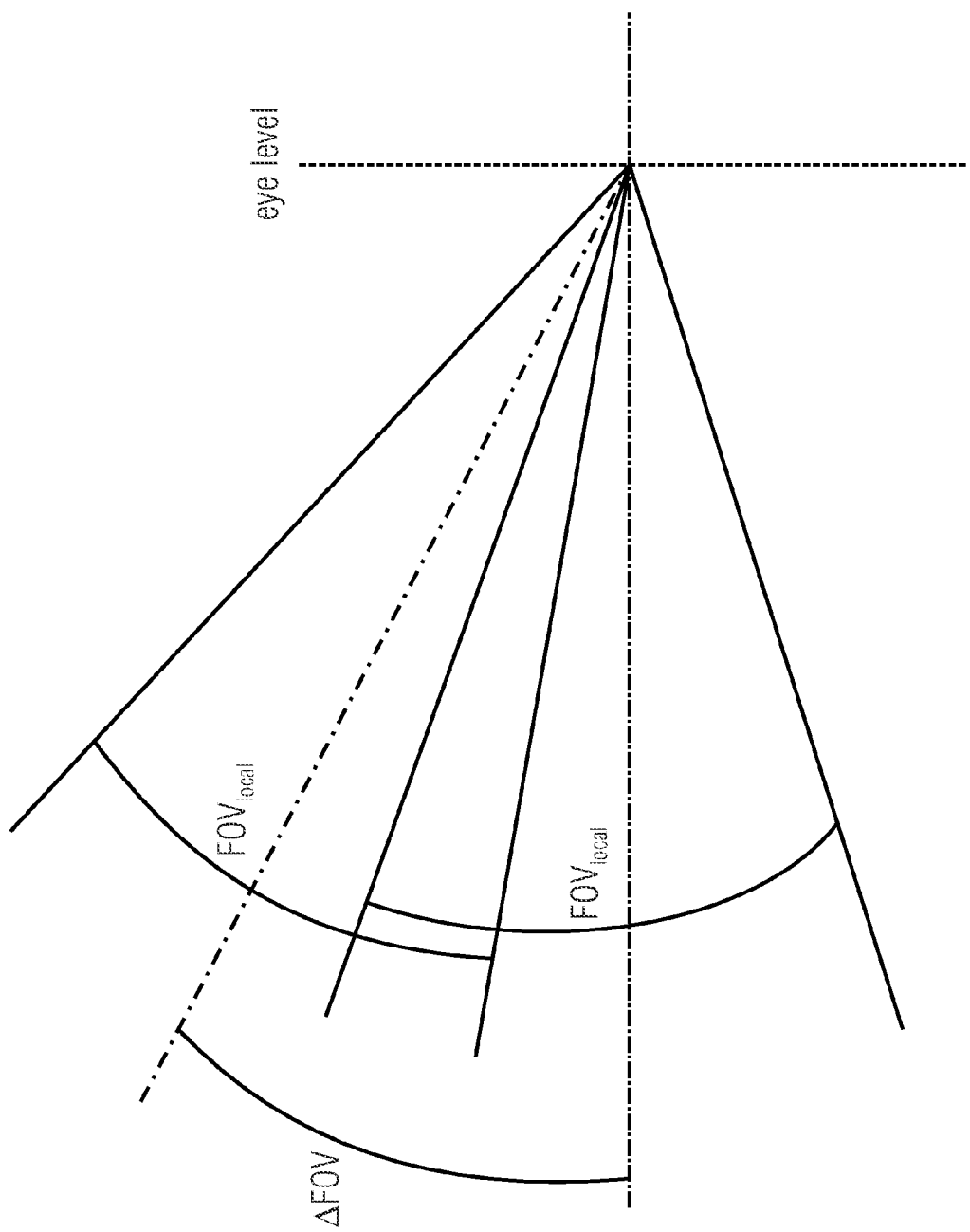
FIGS. 6A,B are schematic representations of an optical path and a decomposition of the FOV for deriving an inventive equation for a displayable overall number of pixels.

Further, reference is made to FIGS. 6a and 6b, based on which the overlap of parts of the field of view (FOV) projected by adjacent projection optics 125 (or microlenses) in the angular space is described. In embodiments, it is possible that not only directly adjacent, but also neighbors "after next" (or projections 135 of projection optics 125 that are not arranged immediately side by side in the two-dimensional distribution 122) overlap. This is also illustrated exemplarily in the projection of the letter "B" in FIG. 3.

Thus, in embodiments, it is possible that also an overlap (or "pairing") of after-next or even further apart projections (or adjacent sub-images) is realized. In other words, an overlap of projected or displayed parts of the FOV caused by projection optics 125 (or "lenslets") that are not directly adjacent is possible.

It should be noted that the mutual area overlap essentially corresponds to the parameter a in the inventive equation 6 which will be derived exemplarily based on FIGS. 6a and 6b. Here, σ=0 describes the case that no overlap exists, while σ=1 describes the case that complete overlap exists. In embodiments, the mutual area overlap is greater than 0 and less than 1. This means that there is a partial but not a complete overlap.

In embodiments, the overlap of the individual image contents according to inventive equation 6, which is uniquely or clearly determined by the selection of focal lengths f of the microlenses and F of the field lens, is particularly advantageous.

In embodiments according to FIGS. 1a and 1b, the projection optics array 120 can be implemented to superimpose the projections 135 of the sub-images to the overall image 150 in the image plane 140 such that a central tendency of a distribution of the mutual area overlap 139 of the projection of pairs 137 is between 0.2 and 0.8. The central tendency of the distribution of the mutual area overlap can, for example, have a value of 0.5. Typically, this value allows a high image quality for the display of the overall image in the image plane.

In embodiments according to FIGS. 1a and 1b, projections 135 overlapping in the image plane 140 are also adjacent to one another in the projection optics 125. In other words, the projection of pairs 137 shown in FIG. 1B forming the mutual area overlap 139 are allocated to two adjacent projection optics 125 of the projection optics array 120 shown in FIG. 1A.

In embodiments, the projection optics 125 are each allocated to a sub-area 115 of the imager 110 (see FIG. 1A). Here, a pitch 127 of the projection optics 125 is equal to a pitch 117 of the sub-areas 115 of the imager 110 allocated to the projection optics 125. By using an equal pitch of the projection optics and the allocated sub-areas, individual sub-images provided by the allocated sub-areas 115 of the imager 110 can be mapped to infinity. Here, a distance of the two-dimensional distribution 122 of the projection optics 125 from the two-dimensional distribution of sub-areas 115 of the imager 110 can correspond, for example, to the resulting focal length $F_{res}$ from the addition of the refractive power of the projection optics 125 with focal length f and the refractive power of the field lens 130 with focal length F.

In embodiments according to FIGS. 1a and 1b, the projection optics array 120 further comprises a field lens 130 which is downstream of the two-dimensional distribution 122 of the projection optics 125 in the projection direction 111, in order to direct the projections 135 of the sub-images into a pupil 103 of a user of the projection display 100. Thus, the image plane 140 can be a virtual image plane, wherein the imager 110 and the two-dimensional distribution 122 of the projection optics 125 are arranged between the same and the field lens 130. An eye 105 of the user is schematically illustrated in FIG. 1A.

As is shown exemplarily in FIG. 1A, the field lens 130 can be implemented to change angles 102 of optical channels with respect to a direction of an optical axis 101 of the projection optics array 120 such that the optical channels run through the pupil 103 into the eye 105 of the user. Advantageously, the focal point of the field lens is close to the center of rotation of the eyeball. Here, the optical channels each comprise optical paths through individual projection optics 125 in the projection direction 111. By using several optical channels for the projection of sub-images onto the image plane, multichannel projection can essentially be obtained.

The field lens 130 shown in FIG. 1A can, for example, be a Fresnel lens. Typically, a Fresnel lens is comparatively thin. Hence, by using the Fresnel lens as a field lens, the structural length of the projection display can be shortened further.

Thus, FIG. 1A exemplarily shows a schematic diagram of the optics scheme of the projection display 100. The basic structure of the embodiment shown in FIG. 1A can be summarized as follows. Sub-images of the whole image content to be transmitted are each represented in the sub-areas 115 as an array (two-dimensional grid) on the imager 110 or micro imager. Each of these sub-images is mapped by an allocated projection optics 125 (e.g. microlens) of the two-dimensional distribution 122 (lens array). The field lens 130 downstream or subsequent in the projection direction 111 maps all sub-images in an overlapped manner into the eye 105 of the viewer. By this array according to FIG. 1A, a contiguous virtual overall image results for the user or viewer in the image plane 140.

Figure 2A:
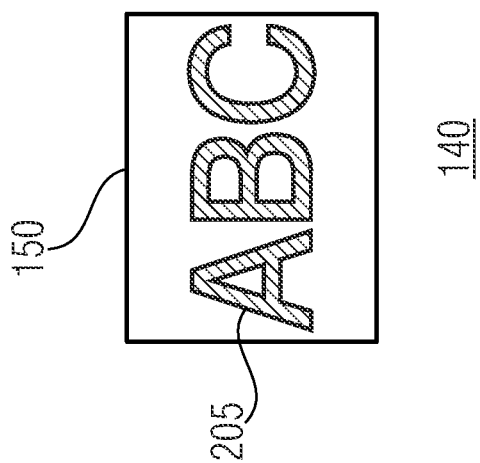
FIG. 2A is a schematic representation for illustrating an inventive overall image in the image plane.

FIG. 2a shows a schematic representation for illustrating an inventive overall image in the image plane. FIG. 2a exemplarily shows a projected virtual overall image 150. The projected virtual overall image 150 of FIG. 2a is within the image plane 140 of the projection display 100 shown in FIG. 1A. The overall image 150 within the image plane 140 comprises image content 205. For example, the image content 205 of the overall image 150 represents the symbols "ABC" (complete image content).

Figure 2B:
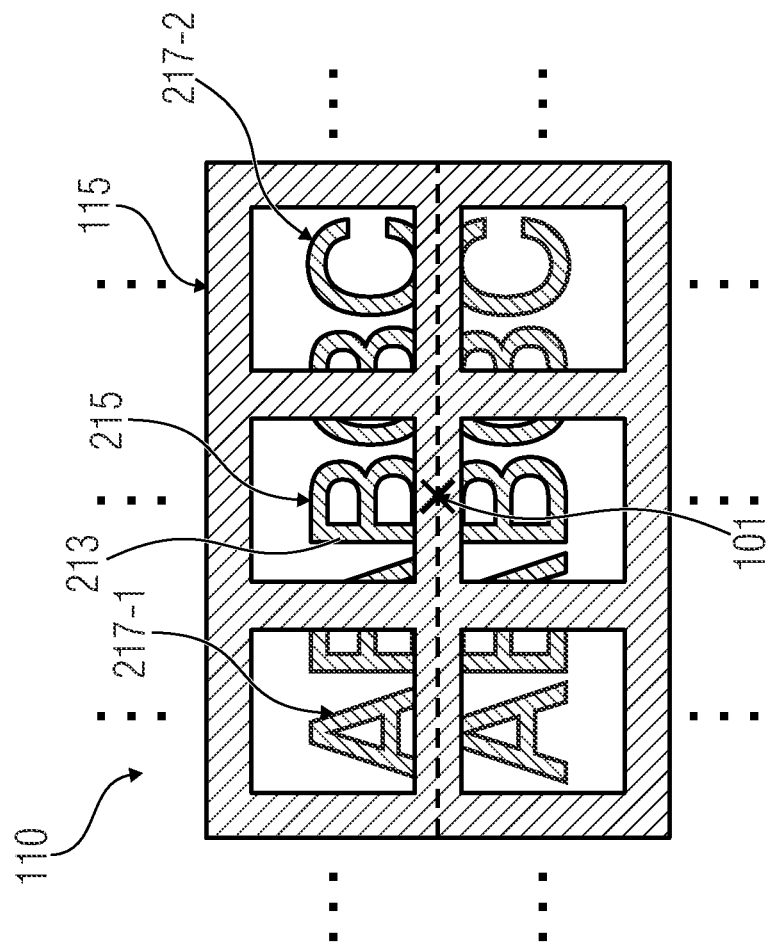
FIG. 2B is a schematic representation for illustrating sub-images in a two-dimensional distribution of sub-areas of an imager according to an embodiment of the present invention.

FIG. 2b shows a schematic representation for illustrating sub-images in a two-dimensional distribution of sub-areas of an imager according to an embodiment of the present invention. FIG. 2b exemplarily shows partial or sub-images 215 on the imager 110 or micro display. As shown in FIG. 2b, the sub-images 215 are displayed by the imager 110 in a two-dimensional distribution of sub-areas 115 of the imager 110. The sub-images 215 provided in the two-dimensional distribution of sub-areas 115 of the imager 110 represent parts of the overall image 150 shown in FIG. 2a with the image content 205. Further, the projection optics 125 shown in FIG. 1A are each allocated to the sub-areas 115 of the imager 110 shown in FIG. 2b. Further, the schematic representation of FIG. 2b shows the optical axis 101 of the projection optics array 120. The optical axis 101 shown in FIG. 2b runs essentially through a center of the two-dimensional distribution of sub-areas 115 of the imager 110.

In the embodiment shown in FIG. 2b, the imager 110 is implemented to display, with increasing distance from the optical axis 101 of the projection optics array 120, the sub-images 115 in the sub-areas 115 of the imager 110 allocated to the projection optics 125 such that the same are increasingly decentered parts of an overall image to be displayed which is provided to the imager 110. The overall image to be displayed provided to the imager 110 essentially corresponds to the projected virtual overall image 150 with the image content 205 in the image plane 140.

In embodiments, the optical axis 101 is defined in that the same runs essentially through a center of the two-dimensional distribution of sub-areas 115 of the imager 110.

In FIG. 2b, sub-images 217-1, 217-2 represented in sub-areas of the imager 110 with a larger distance to the optical axis 101 compared to a sub-image 213 represented in a sub-area of the imager 110 having the lowest distance to the optical axis 101, are more decentered parts of the overall image to be displayed and provided to the imager 110. The sub-image 213, for example, represents a relatively central part (e.g. the symbol "B") for the image content of the projected overall image 150, while sub-images 217-1, 217-2 represent more decentered parts (e.g. the symbols "A" or "C") for the image content 205 of the projected overall image 150. By multichannel projection across several optical channels, the sub-images 215 or the increasingly more decentered parts of the overall image to be displayed and provided to the imager 110 can be superimposed to the overall image 150 in the image plane 140. Thus, the projected virtual overall image 150 with the complete image content (e.g. "ABC") results in the image plane 140.

Figure 3:
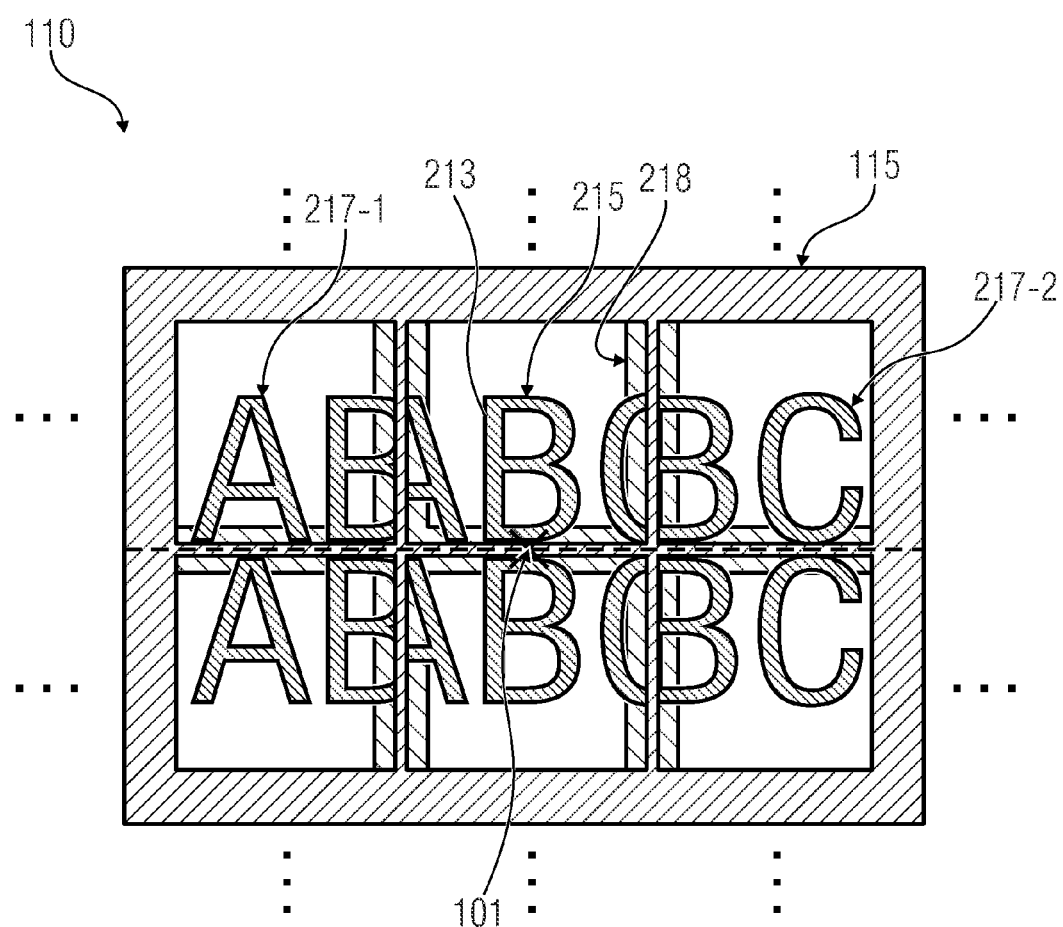
FIG. 3 is a schematic representation for illustrating sub-images in a two-dimensional distribution of sub-areas of an imager according to an embodiment of the present invention.

FIG. 3 shows a schematic representation for illustrating sub-images in a two-dimensional distribution of sub-areas of an imager according to an embodiment of the present invention. FIG. 3 shows exemplarily a continuous edge decrease of the image brightness of the sub-images on the edges on the imager for suppressing artifacts in the projected virtual overall image. The embodiment of FIG. 3 again shows the imager 110, on which the sub-images 215 are represented in the two-dimensional distribution of sub-areas 115 of the imager 110. The sub-images 215 shown in FIG. 3 can, for example, be increasingly decentered parts of an overall image to be displayed which is provided to the imager 110, as has been discussed based on the embodiment of FIG. 2b.

In the embodiment according to FIG. 3, the imager 110 can be implemented to display each of the sub-images 215 with an image brightness which continuously decreases towards the edge 218 of the sub-image 215. Thereby, artifacts in an overlapping area of the projections in the image plane can be suppressed or prevented.

The image brightness of the respective sub-image on the imager 110 can, for example, be adjusted such that the image brightness is higher in a center area of the sub-image 215 than in an edge area surrounding the center area (edge 218). At the same time, the image brightness can be adjusted such that the same falls monotonously from a maximum to a minimum value. This describes an exemplarily continuous edge decrease of the image brightness. In the embodiment of FIG. 3, the overlapping area where the artifacts are suppressed or prevented by using the exemplarily continuous edge decrease of the image brightness corresponds to the mutual area overlap 139 of the projections 135 of the sub-images 135 in the image plane 140 shown in FIG. 1B.

In other words, in the embodiment shown in FIG. 3, the imager can be implemented such that the image brightness decreases continuously at edges of the sub-images on the imager in order to suppress brightness jumps in the superimposed overall image.

Figure 4:
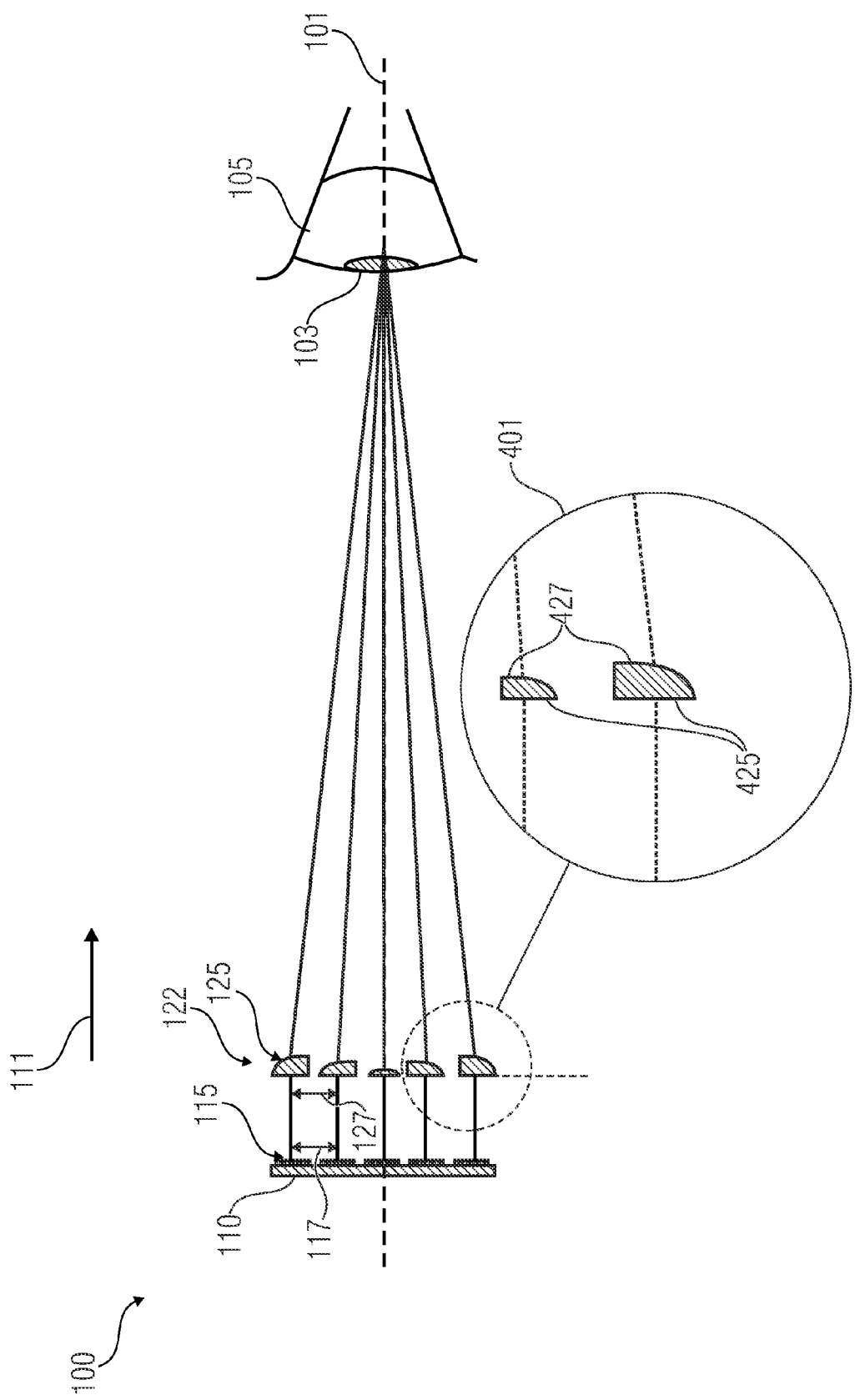
FIG. 4 is a side view of a two-dimensional distribution of projection optics according to an embodiment of the present invention.

FIG. 4 shows a side view of a two-dimensional distribution of projection optics according to an embodiment of the present invention. The side view of FIG. 4, shows the imager 110 with the two-dimensional distribution of sub-areas 115, and the two-dimensional distribution 122 of projection optics 125 of the projection display 100. In the embodiment shown in FIG. 4, the projection optics 125 are each allocated to a sub-area 115 of the imager 110. Similarly to the embodiment according to FIG. 1A, in the embodiment shown in FIG. 4 a pitch 127 of the projection optics 125 is equal to a pitch 117 of the sub-areas 115 of the imager 110 allocated to the projection optics 125.

In embodiments, the two-dimensional distribution 122 of the projection optics 125 comprises a plurality of lens segments 425 that are decentered differently with respect to their aperture. Here, the plurality of lens segments 425 is implemented to direct the projections of the sub-images into the pupil 103 of the user of the projection display 100, as is exemplarily shown in FIG. 4. By using the several differently decentered lens segments 425, the projections of the sub-images provided by the sub-areas 115 of the imager 110 can be directed directly into the pupil 103 of the user without necessitating a field lens (e.g. field lens 130 in FIG. 1A) downstream in the projection direction 111. The function of such a downstream field lens can thus be provided by the entirety of differently decentered lens segments 425.

In the circle 401, the lens segments 425 decentered differently with respect to the aperture are illustrated in an enlarged manner. The lens segments 425 illustrated in an enlarged manner within the circle 401 comprise lens vertexes 427 with different decentration than the aperture of the respective lens segment. By providing the different decentration of the lens vertexes 427, the same effect as with the two-dimensional distribution 122 of the projection optics 125 together with the field lens 130 downstream in the projection direction 111 can be obtained merely by the plurality of the lens segments 425.

In other words, in the embodiment shown in FIG. 4, by using a lens array including lenslets consisting of differently decentered lens segments, the optical function of a field lens can be integrated into the lens array. Thus, a separate field lens is no longer necessitated.

Figure 5A:
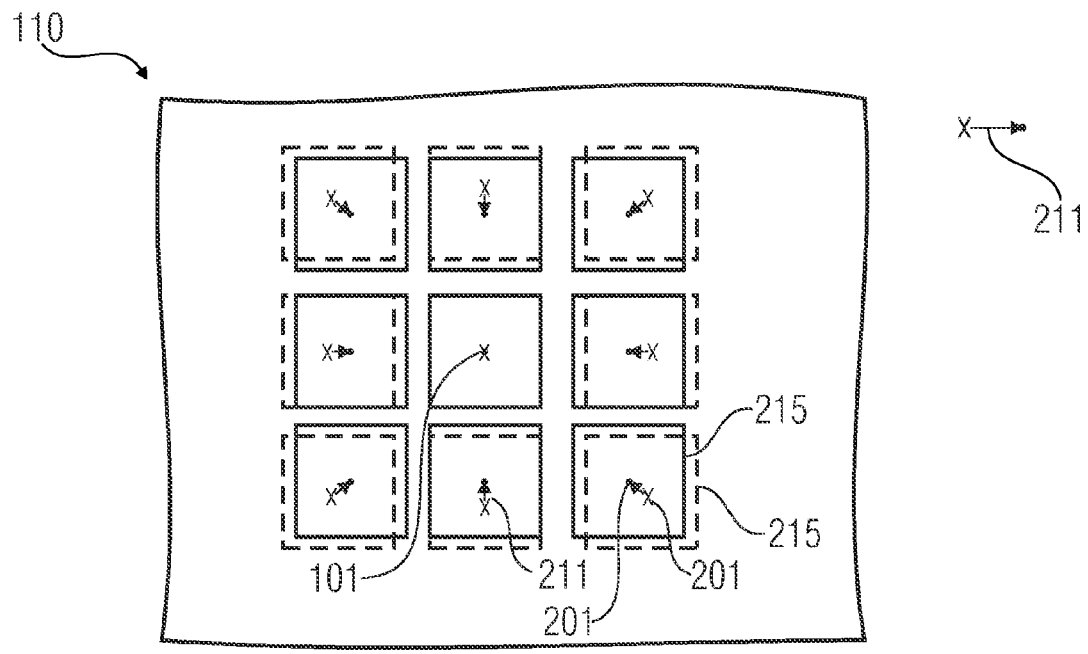
FIGS. 5A,B are top views of imagers for displaying displacements of sub-images according to embodiments of the present invention.
Figure 5B:
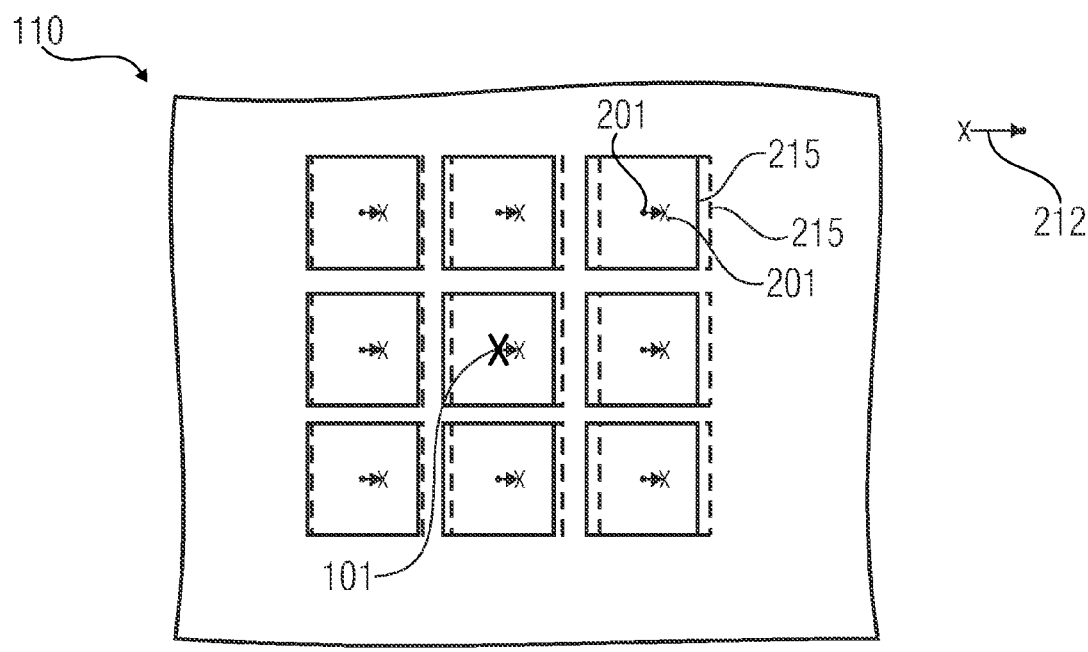

FIGS. 5a and 5b show top views of imagers for representing displacements of sub-images according to embodiments of the present invention. In the embodiment shown in FIG. 5A, the imager 110 is implemented to increase or decrease distances between centers 201 of the sub-images 215 to adjust a projection distance. FIG. 5A shows the sub-images 215 represented on the imager 110 in two different settings. Further, FIG. 5A shows the optical axis 101 of the projection optics array 120 with respect to which the sub-images 215 are represented. The two different settings of the sub-images 215 with respect to the optical axis 101 on the imager 110 essentially correspond to two different projection distances for the projected virtual overall image in the image plane. In the first setting, the sub-images 215 are illustrated by dotted lines, while in the second setting the sub-images 215 are illustrated by continuous lines. Further, the centers 201 of the sub-images 215 are illustrated by crosses in the first setting, while they are illustrated by dots in the second setting.

When switching between the first and second settings of the imager 110, the centers 201 of the sub-images 215 can, for example, be displaced in a radial symmetrical manner with respect to the optical axis 101 (displacement vectors 211). By a radial symmetrical displacement of the centers 201 of the sub-images 215 with respect to the optical axis 101, the distances between the centers 201 of the sub-images 215 change in the respective settings. The distances between the centers 201 of the sub-images 215 can be increased or decreased, for example by a displacement along the displacement vectors 211 from the first setting to the second setting. This enables adjusting the position of the projected virtual overall image or increasing or decreasing the projection distance.

In embodiments according to FIG. 5A, by a software-controlled change of the distances of the sub-images to one another on the imager, different distances of the virtual image to the viewer can thus be adjusted for compensating possible defective vision.

FIG. 5B shows, similarly to the embodiment shown in FIG. 5A, the sub-images 215 with their centers 201 for two different settings of the imager 110. In the first setting, the sub-images 215 are illustrated by continuous lines and their centers 201 by dots, while in the second setting the sub-images 215 are illustrated by dotted lines and their centers 201 by crosses. Further, again, the optical axis 101 of the projection optics array 120 is shown.

In the embodiment of FIG. 5B, the imager 110 is implemented to displace all sub-images 215 evenly in the direction of a lateral extension of the two-dimensional distribution of the sub-areas of the imager 110 (direction 212 of the displacement vectors 212). Here, the even displacement of the sub-images 215 (or the displacement of the centers 201 of all sub-images 215 in the direction of the displacement vectors by the same amount) can be set in dependence on a measured viewing direction of an eyeball of a user with respect to the optical axis 101 of the projection optics array 120. Due to the even displacement of the sub-images 215 in dependence on the measured viewing direction of the eyeball of the user, squinting of the user with respect to the optical axis 101 of the projection optics array 120 can be compensated. This again allows perception of ghost images to be suppressed or prevented, which can further increase the image quality of the multichannel projection.

Thus, in embodiments according to FIG. 5B, different squint angles and hence decentrations of the eye of the viewer to the optical axis of the projection display can be compensated by a software-controlled even displacement of the sub-images on the imager.

Further, in embodiments according to FIG. 5B, the position of the eyeball in relation to the optical axis of the projection display can also be determined by an eye-tracking sensor. From the measured quantity provided by the sensor, a set value for decentration or even displacement of the sub-images on the imager can be derived.

In embodiments, the two-dimensional distribution 122 of the projection optics 125 comprises a plurality of plano-convex or biconvex projection lenses. In FIG. 1A, the projection optics 125 are exemplarily illustrated with a plurality of biconvex projection lenses.

In embodiments, the projection optics array 120 comprises a plurality of two-dimensional distributions of projection optics (not shown) stacked on top of one another in the projection direction 111. Here, the plurality of two-dimensional distributions of the projection optics can be implemented to correct aberrations of the projection optics array 120. By providing the plurality (stacks) of two-dimensional distributions of the projection optics, corrections of mapping errors during projection by the individual projection optics can be obtained.

In embodiments, the imager 110 is a transmissive or reflective imager.

FIGS. 6a and 6b show schematic representations of an optical path and a decomposition of the field of view or FOV for deriving an inventive equation for a displayable overall number of pixels. FIG. 6A exemplarily shows an optical path for a mapping to infinity. For illustrating the optical path, in the following the case of a virtual mapping to infinity is considered exemplarily by neglecting a distance between the two-dimensional distribution 122 of projection optics 125 (lens array) and the field lens 130. Here, the display or imager 110 is, for example, within the focal plane of the system consisting of the individual lenslets (or the individual projection optics 125) of the array with focal length f and the field lens 130 with focal length F. Further, the eye 105 of the viewer is, for example, within the focal plane of the field lens 130 at the distance F.

The part of the field of view $FOV_{local}$ transmitted by a lenslet of the array is obtained in paraxial approximation for the projection of a virtual image in infinity from the quotient of the extension of the sub-image d and the resulting overall focal length $F_{res}=f*F/(f+F)$. If further the linear filling factor of the sub-images on the imager with $\eta=d/a$, wherein a is the extension of the lenslet shown in FIG. 6A, and the f-number of a lenslet $f/\#=f/a$ are inserted, the following is obtained $$FOV_{local} = \frac{d}{F_{res}} \qquad (3)$$
$$= d\frac{F+f}{Ff}$$
$$= \eta\frac{F+f}{F\frac{f}{\#}}$$

The field lens generates a global component of the field of view $$FOV_{global} = \frac{D-a}{F} \quad (4)$$

wherein D is an overall extension of the several sub-images 215 of FIG. 6A.

The resulting field of view is obtained from the summation of both components $$FOV = FOV_{global} + FOV_{local} \quad (5)$$

$$= \frac{D\frac{f}{\#} - f + \eta(F+f)}{F\frac{f}{\#}}$$

In order to obtain a connection between adjacent projected sub-images (or between the projections 135 of the sub-images in the image plane 140) which is a homogenous as possible, partial overlapping of the respectively projected angles of view (or the projections 135 of the sub-images) is advantageous. The linear overlapping of the projections 135 of the sub-images in the image plane 140 is calculated to $$\sigma = \frac{FOV_{local} - \Delta FOV}{FOV_{local}} \quad (6)$$

$$= \frac{FOV_{local} - a/F}{FOV_{local}}$$

$$= 1 - \frac{f}{\eta(F+f)}$$

A precise connection of adjacent sub-images corresponds to a $\sigma=0$ (i.e. no overlapping), while the opposite extreme of complete overlapping, which describes the case of a multiple projection or the multichannel projection of identical sub-images, corresponds to $\sigma=1$.

If the number of pixels displayable in one dimension by this optics scheme is estimated, the following connections will result. The number of pixels of a channel is calculated from the pixel pitch (or the center-to-center distance of the pixels) of the imager p and the sub-image size d to $$n = \frac{d}{p} \quad (7)$$

$$= \eta \frac{a}{p}$$

$$= \eta \frac{f}{p\frac{f}{\#}}$$

The overall number of pixels displayed in one dimension are obtained therefrom $$N = n\frac{FOV}{FOV_{local}} \quad (8)$$

$$= \frac{f}{p\frac{f}{\#}} \frac{D\frac{f}{\#} - f + \eta(F+f)}{F+f}$$

The evaluation of the above equation shows that, compared to the number of pixels of the imager D/p, only a significantly smaller number of pixels is actually displayable. Thus, a tradeoff has been found between the request for a high number of pixels and the above-described request for an overlap of adjacent projected sub-images which is as large as possible for obtaining a good image connection. Overlaps of $\sigma=\frac{1}{2} \ldots \frac{3}{4}$ allow a good tradeoff between both requests. FIG. 2b shows the arrangement of the sub-images 215 on the imager 110 or micro imager for the exemplary special case $\sigma=0.5$ and an exemplary area fill factor of the sub-images 215 of $\eta=50\%$.

For near-axis parts of the FOV, the eye motion box of the projector corresponds to the height which a beam having an angle of incidence equal to the local FOV of an array element needs to have on the field lens in order to be refracted by the same to a beam parallel to the axis.

$$EMB = FFOV_{local} \quad (9)$$

$$= \eta \frac{F+f}{\frac{f}{\#}}$$

$$= \frac{a}{1-\sigma}$$

However, this equation only applies as long as the eye motion box does not exceed the overall extension D of the sub-images 215. If this is no longer given for a large overlap of the local $FOV_{local}\sigma$, the size of the EMB then corresponds to D. In any case, the EMB is greater than the aperture of an individual lenslet.

For off-axis parts of the FOV, the size of the eye motion box can be reduced, since fewer lenslets might contribute to the mapping. The duction of the eyeball when focusing on these off-axis parts of the FOV causes decentration of the iris. If the focal point of the field lens lies behind the iris (e.g. at the center of rotation of the eye), the orientation of this decentration will correspond to the position of the beams originating from the lenslet which exactly project these parts of the FOV. This circumstance at least partly compensates the reduction of the size of the EMB for off-axis parts of the FOV.

In embodiments, the described array can be advantageously realized by an LED backlit transmissive LCD micro imager or a self-luminous OLED micro display or alternatively with a reflective LCoS or a DLP ("digital light processing") tilting mirror array.

In embodiments, a plano-convex or biconvex lens array 122 having typical lens pitches (center-to-center distances of the projection optics) in the range of one millimeter and a plano-convex or biconvex field lens 130 can serve as mapping optics or can be comprised by the projection optics array 120. The focal length F of the field lens 130 can here be selected in the range of 20 . . . 40 mm to obtain sufficient distance to the eye of the viewer (eye clearance, EC). The distance of the optics to the eye can, for example, be selected such that the focal plane of the field lens 130 where sub-beams of the individual lenslets (or the optical paths through the projection optics 125) meet lies in the area between the cornea and the center of rotation of the eyeball of the user.

To obtain an improved aberration correction of the lens array 122, replacing the simple planar or biconvex lens array 122 by several stacked lens arrays is useful, as was described above.

Further, in embodiments, a space-saving realization of the optics or a shortened structural length of the projection display 100 can be obtained by using a Fresnel lens as field lens 130.

In order to obtain a connection of the individual projected sub-images in the image plane which is as good as possible, partial overlapping of the field of view or the projections of adjacent sub-images can be realized, as has been discussed based on the embodiment shown in FIGS. 1a and 1b. For avoiding a limitation of the number of pixels displayable by the projection display 100 and above that a reduction of the image brightness at the edge of the overall image 150 lying in the image plane, possible artifacts of the transitions between the projections of the sub-images in the projected virtual overall image 150 can be alleviated by the continuous decrease of the image brightness at the edge of each sub-image on the imager 110. This has already been explained based on the embodiment shown in FIG. 3.

With respect to the embodiment of FIG. 5A, the position of the virtual image plane in which the individual projected sub-images overlap can be influenced by increasing or decreasing the distances between the centers 201 of the sub-images 215 on the micro display or the imager 110. Thus, a purely software-technological adaptation to a possible defective vision of the viewer is possible without mechanically movable parts. By increasing the distances of the image centers to one another, for example, the distance of the virtual image plane to the viewer or the projection distance could be increased.

Decentration of the eye of the viewer with respect to the optical axis 101 of the projection display 100 can result in the perception of ghost images by viewing sub-images of the imager not through the allocated, but through adjacent lenslets or projection optics (crosstalk, optical crosstalk). An even lateral displacement or height displacement of all sub-images on the imager controlled by image preprocessing software allows obtaining compensation of such a decentration within specific limits (cf. embodiment of FIG. 5B). If the projection display is supplemented by a sensor for eye tracking, a set signal for the image preprocessing software for decentration of the sub-images can be derived from the position information of the eyeball obtained by the sensor.

In embodiments, full-color display can be obtained by a time-sequential switching-through of the sub-images in the prime colors RGB. Alternatively, RGB pixel triples can be used which, however, reduce the displayable number of pixels for a given pixel size. Transverse chromatic aberrations in the virtual image can be pre-compensated, for example, by suitable image preprocessing for color-dependent pre-distortion of the prime color images.

In embodiments, the full-color display can be enabled by using color-sequential display by switching the color of the illumination and respective synchronous changing of the image contents for the respective prime color.

In embodiments, transverse chromatic aberrations of the mapping optics or the projection optics array can be compensated by a suitable adaptation of the image contents with the imager.

Analogously, compensation of distortion errors caused by the lenslets of the array and the effect of the field lens is possible by pre-distorting the sub-image content.

In summary, embodiments provide a projection display having a micro display, an even two-dimensional array of projection optics, each mapping an allocated sub-area of the image, and a field lens for superimposing the optical paths in the plane of the viewer, wherein the image content of the sub-areas of the imager display increasingly decentered parts of the overall image with the distance of the respective lenslet to the array axis. A plano-convex or biconvex lens array can be used, for example, as a projection optics array. Further, several stacked lens arrays for obtaining improved aberration correction can be used as a projection optics array.

In embodiments, the contents of adjacent sub-images on the imager can partly overlap after multichannel projection in the image plane.

In embodiments, a two-eye system having different image content on the left and right can be used for the stereoscopic presentation of three-dimensional scenes.

Embodiments of the present invention provide a method for projecting an overall image 150. The method comprises, for example, the following steps. Sub-images are displayed by an imager 110 in a two-dimensional distribution of sub-areas 115 of the imager 110. Further, projections 135 of the sub-images are superimposed to an overall image 150 by a projection optics array 120 with a two-dimensional distribution 122 of projection optics 125 in an image plane 140 such that a mutual area overlap 139 of the projections 135 of the sub-images in the image plane 140 in pairs results, which is between 0.1 and 0.8 for all pairs 137. Here, the projection display 100 is implemented such that the overall image 150 is a virtual overall image.

The above-described embodiments present merely an illustration of the principles of the present invention. It is obvious that modifications and variations of the arrays and details described herein will be obvious to other persons skilled in the art. Hence, it is intended that the invention is merely limited by the scope of the following claims and not by the specific details presented herein based on a description and discussion or explanation of the embodiments.

Embodiments of the present invention provide an optical concept for projecting virtual images with a projection display comprising an imager or a micro display and a miniaturized optics or projection optics array positioned close to the eye. The projection optics array comprises, for example, a two-dimensional distribution of projection optics (lens array) and a field lens, wherein the projection optics or lenslets of the array each map sub-areas of the overall FOV. The inventive optics scheme has the advantage that the same can overcome the limitation of the number of pixels displayable by a known array projector according to conventional technology. At the same time, the advantage of a short structural length is maintained with the inventive optics scheme.

Embodiments of the present invention provide a simple optics. The inventive optics is characterized in that a very short head-mounted display (HMD), an electric adjustment of the image distance and an electric compensation of the decentration can be realized.

The present invention shows the following advantages. Overlapping of the field of view (FOV) and hence a better tradeoff between the number of pixels and the eye motion box (EMB) is obtained. Further, artifacts of the array are no longer visible (keyhole principle or effect as when using a telescope) or only very weak artifacts of the FOV segmentation remain.

Thus, embodiments of the present invention allow electric focusing, electric compensation of decentration as well as electric compensation of transverse chromatic aberrations.

The inventive projection display serves, for example, for displaying moving and static virtual images with miniaturized optics positioned close to the eye, as is necessitated for head-mounted displays (e.g. data display glasses or smart glasses).

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Projection display comprising:
an imager for displaying sub-images in a two-dimensional distribution of sub-areas of the imager;
a projection optics array with a two-dimensional distribution of projection optics implemented to superimpose projections of sub-images to an overall image in an image plane such that a mutual area overlap of the projections of the sub-images in the image plane in pairs results, which is between 0.1 and 0.8 for all pairs;
wherein the projection display is implemented such that the overall image is a virtual overall image.

2. Projection display according to claim 1, wherein the projection optics array is implemented to superimpose projections of the sub-images to the overall image in the image plane such that a central tendency of a distribution of the mutual area overlap of the projections of the pairs is between 0.2 and 0.8.

3. Projection display according to claim 1, wherein projections overlapping in the image plane are also adjacent to one another in the projection optics.

4. Projection display according to claim 1, wherein the projection optics are each allocated to a sub-area of the imager, wherein a pitch of the projection optics is equal to a pitch of the sub-areas of the imager allocated to the projection optics.

5. Projection display according to claim 1, wherein the projection optics array further comprises a field lens downstream of the two-dimensional distribution of the projection optics in the projection direction, in order to direct the projections of the sub-images into a pupil of a user of the projection display, such that the image plane is a virtual image plane, wherein the imager and the two-dimensional distribution of the projection optics are arranged between the same and the field lens.

6. Projection display according to claim 5, wherein the field lens is a Fresnel lens.

7. Projection display according to claim 1, wherein the projection optics are each allocated to sub-areas of the imager, wherein the imager is implemented to display, with increasing distance to an optical axis of the projection optics array in the sub-areas of the imager allocated to the projection optics, sub-images which are increasingly decentered parts of an overall image to be displayed which is provided to the imager, wherein the optical axis runs essentially through a center of the two-dimensional distribution of sub-areas of the imager.

8. Projection display according to claim 1, wherein the two-dimensional distribution of the projection optics comprises a plurality of plano-convex or biconvex projection lenses.

9. Projection display according to claim 1, wherein the projection optics array comprises a plurality of two-dimensional distributions of projection optics stacked above one another in the projection direction, wherein the plurality of two-dimensional distributions of projection optics are implemented to correct an aberration of the projection optics array.

10. Projection display according to claim 1, wherein the imager is implemented to display each of the sub-images with an image brightness which continuously decreases towards the edge of the sub-image, so that artefacts in an overlapping area of the projections in the image plane are suppressed or prevented.

11. Projection display according to claim 1, wherein the two-dimensional distribution of the projection optics comprises a plurality of lens segments which are differently decentered with respect to their aperture, wherein the plurality of lens segments is implemented to direct the projections of the sub-images into a pupil of a user of the projection display.

12. Projection display according to claim 1, wherein the imager is implemented to increase or decrease distances between centers of the sub-images to adjust a projection distance.

13. Projection display according to claim 1, wherein the imager is implemented to displace all sub-images evenly in the direction of a lateral extension of the two-dimensional distribution of the sub-areas of the imager, wherein the even displacement of the sub-images is adjustable in dependence on a measured position of an eyeball of a user with respect to an optical axis of the projection optics array.

14. Projection display according to claim 1, wherein the imager is a transmissive or a reflective imager.

15. Method for projecting an overall image with a projection display, comprising:
displaying sub-images with an imager in a two-dimensional distribution of subareas of the imager;
superimposing projections of the sub-images to an overall image in an image plane by a projection optics array with a two-dimensional distribution of projection optics such that a mutual area overlap of the projections of the sub-images in the image plane in pairs results, which is between 0.1 and 0.8 for all pairs;
wherein the projection display is implemented such that the overall image is a virtual overall image.

* * * * *